Aug. 19, 1930.  E. H. NIELSEN  1,773,433
ASPARAGUS HANDLING MACHINE
Filed Jan. 28, 1929  2 Sheets-Sheet 1
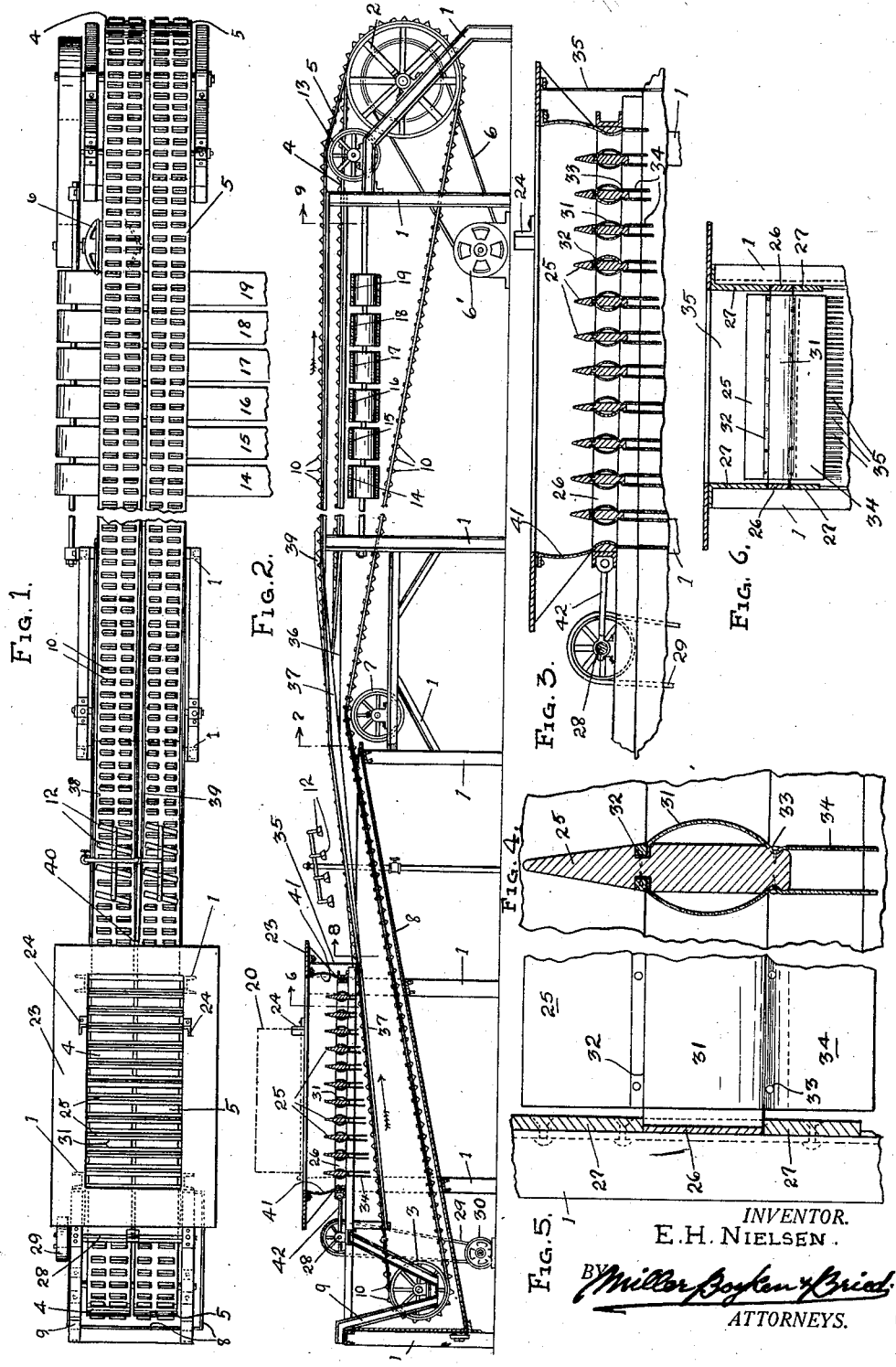
INVENTOR.
E. H. NIELSEN.
ATTORNEYS.

Aug. 19, 1930.  E. H. NIELSEN  1,773,433
ASPARAGUS HANDLING MACHINE
Filed Jan. 28, 1929   2 Sheets-Sheet 2
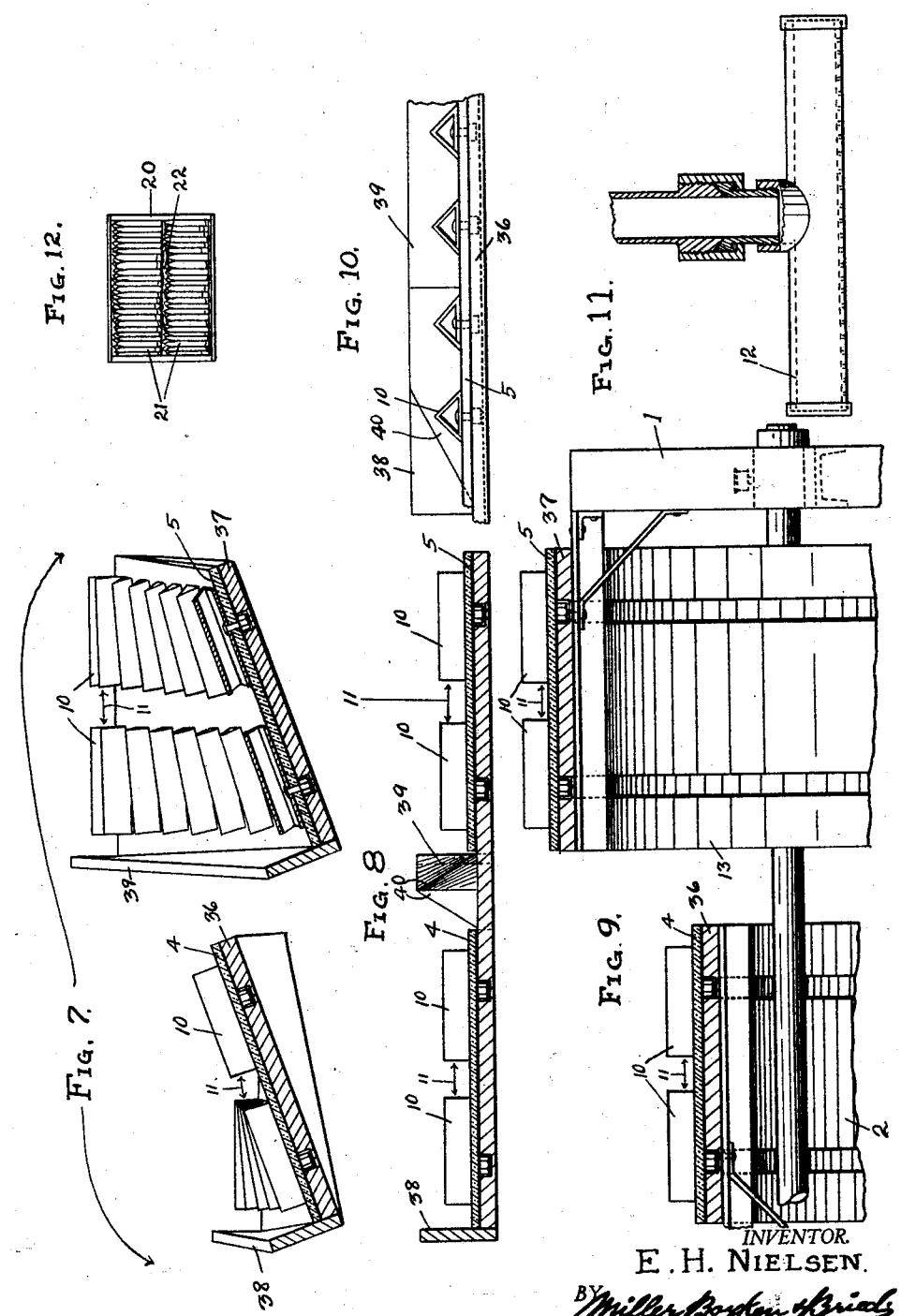
INVENTOR.
E. H. NIELSEN.
BY
ATTORNEYS.

Patented Aug. 19, 1930

1,773,433

UNITED STATES PATENT OFFICE

EMIL H. NIELSEN, OF OAKLAND, CALIFORNIA, ASSIGNOR TO GOLDEN STATE ASPARAGUS CO., OF SAN FRANCISCO, CALIFORNIA, A CORPORATION OF CALIFORNIA

ASPARAGUS-HANDLING MACHINE

Application filed January 28, 1929. Serial No. 335,529.

This invention relates to apparatus for the handling of asparagus in the preparation of the same for canning, and has for its objects apparatus which will receive the contents of the field boxes of asparagus, align and separate the stalks, provide a picking table portion, and which will adjust the bases of the stalks with reference to size sorting or grading apparatus, and which will carry away separately the graded sizes. Other objects and advantages of the invention will appear in the drawings and the following description.

Briefly described the invention comprises endless conveyors so arranged as to receive the asparagus from above through a separating grille in a water bath and carry the shoots aligned on the conveyors out of the water bath for further washing under spray pipes, thence along a picking space and for aligning the bases of the shoots through means of tilting the conveyors transversely at an angle, and then carrying aligned shoots past the size grader.

In the drawings Fig. 1 is a plan view of the adjacent conveyors used showing the double runs passing through the water bath under the reciving grille or frame and over the head and tail pulleys, the conveyors being broken in length to permit of being shown on the drawing sheet.

Fig. 2 is an elevation of the apparatus of Fig. 1 with portions of the same shown in section.

Fig. 3 is an enlarged vertical section taken through the receiving frame and grille.

Fig. 4 is broken, still further enlarged section showing one of the grille bars of Fig. 3.

Fig. 5 is a side view of Fig. 4.

Fig. 6 is an enlarged cross section of the apparatus taken through the receiving frame and as shown from the line 6 of Fig. 2, showing a row of hanging flexible devices over the conveyors.

Fig. 7 is an enlarged cross section of the double conveyors taken along the line 7 of Fig. 2 showing the tilted or angular arrangement of the conveyors at this point.

Fig. 8 is a similar cross section of the conveyors as shown in Fig. 7 but taken along the line 8 of Fig. 2 and whereat the conveyors lie in the same plane just before being tilted to the angle shown in Fig. 7.

Fig. 9 is an enlarged cross section of the conveyors taken at the point 9 of Fig. 2 showing the vertical separation of the two adjacent runs of the conveyor.

Fig. 10 is a side view of the conveyor of Fig. 8.

Fig. 11 is an enlarged elevation partly in section showing the construction of one of the angularly adjustable spray pipes positioned over the conveyors adjacent the receiving frame.

Fig. 12 is a plan view of a field box of asparagus shoots showing the double row with the ends all pointing one way, and in which condition it is fed to the apparatus by inverting the box thereover.

In further detail the apparatus comprises suitable framing 1 supporting head pulleys 2 and tail pulleys 3 over which the conveyor passes. The conveyor is double or in fact is two conveyors arranged side by side passing over separate pulleys on a common shaft, or extra wide pulleys wide enough to take both conveyors. The conveyors may be of the chain or belt type, in the present instance the latter are shown and the belts 4 and 5 run side by side spaced slightly apart as indicated.

The head pulleys are driven by a belt 6 from a suitable motor 6', and the return strands of the conveyor pass over suitable idlers as shown at 7 so as to guide the receiving end of the conveyors into a tank 8 which is normally kept full of water when the machine is running, and in which tank the tail pulleys 3 are operatively suspended by means of hangers 9 as indicated, it being understood that since these pulleys run submerged, their shaft bearings are suitably constructed.

The surfaces of the belts 4 and 5 are fitted with transversely extending cleats 10 which take the form best shown in Fig. 10 and wherein they will be seen to be of tubular triangular form bolted or otherwise secured to the belts as indicated. These cleats are spaced about an inch or an inch and a half apart along the belt as indicated and a gap 11 is formed or permitted to remain in the series of cleats on each belt as indicated so as to facilitate the passage of a size grader finger as will hereinafter be explained. The upper run of the conveyors travels in the direction indicated by the arrow of Fig. 2 and for a distance travels upwardly so as to carry the asparagus shoots out of the tank of water and under a series of spray pipes 12 arranged at an angle as shown best in Fig. 1 and from which pipes a spray of water is ejected at the asparagus to thoroughly wash the same and force the stalks downward against the forward side of the advancing cleats. The angular arrangement of the spray pipes has reference to the position or direction in which the heads of the stalks point when carried by the conveyors, and which will be in a direction downward or toward the observer when viewing Fig. 1 and with the butts of the stalks extending in the opposite direction, or upward when viewing this figure.

At the extreme right of the apparatus the forward belt 5 is displaced upwardly by means of an extra idler pulley 13 so as to vertically displace the two belts in the manner indicated in Fig. 2. This is done for the purpose of providing the necessary working room to operate any desired form of size grading apparatus, such for instance that as disclosed in copending patent application Serial No. 317,162 of P. A. Cutter, filed Nov. 5, 1928, and owned by assignee hereof, or any other apparatus which will function in a similar manner to size grade and eject the asparagus, while under the belt conveyors at this point are a plurality of cross conveyors 14, 15, 16, 17, 18 and 19 which are positioned to receive and separately transport the various sizes of asparagus shoots ejected from the belts 4 and 5 by whatever apparatus is employed at this position of the belts.

In feeding asparagus to the belts of the apparatus, it is contemplated that the field boxes be filled with two rows of stalks with the heads all pointing one way as shown in Fig. 12 and wherein the field box is numbered 20 and the shoots of grass 21, the rows being usually separated endwise by the small space 22 which may or may not have a temporary partition dropped between while transporting from the field. In order to feed such a box of asparagus to the conveyors it is inverted over the belts and the stalks permitted to fall to the belts through suitable apparatus adapted to control it so that the alignment of the stalks will be preserved in transverse extension across the belts.

The apparatus over which the box is inverted comprises principally a rigid receiving frame 23 with a plain upper surface and an opening which may be somewhat longer than the box but is substantially the full width of the inside of the box, so that when a box is inverted on this frame all of the asparagus can fall through, it being intended that before inverting the box of grass on the frame a board or sheet of metal be placed over the box, the box and board lifted together and inverted over the frame to the proper position, and the board or sheet of metal quickly pulled out from one end of the box so that the shoots can fall through the frame. Suitable stops may be positioned on the frame as indicated at 24 to insure the proper position of the box.

Positioned below the receiving frame 23 is a series of grillage bars 25 spaced about an inch or inch and a half apart as may be required for the run of grass, and which grillage bars are secured at opposite ends to a frame 26 longitudinally slidable in a fixed frame member or members 27 so that the entire series of grillage bars may be shaken longitudinally of the conveyor or transversely to the bars themselves. The slidable frame 26 is suitably connected as by a pitman 42 to an eccentric on a shaft 28 revolved at a suitable speed by means of a belt 29 extending to a small motor 30 or other source of power so that during the operation of the conveyor belts the grillage bar frame is rapidly oscillated.

The bars of the grille have a form best shown in Fig. 4 wherein the upper portion is shown to be tapered and rounded on the upper edge, and on opposite sides adjacent the lower part of the bar are resilient cushions 31 preferably formed of sheets of soft flexible rubber similar to that used on the inner tube of an automobile, and which sheets are secured at 32 to the bars also at 33 with outwardly arched portions 31 lying between the secured points, and provided with downwardly extending portions 34 hanging below the secured point 33. The downwardly extending portions 34 terminate just above the cleats on the conveyor belt as indicated best in Fig. 2. Connecting the under-side of the fixed frame 23 and shaker frame 26 are flexible webs 41.

At the forward end of the receiving frame 23 and extending clear across both conveyor belts is a series of heavy laces, chains or other flexible devices as indicated at 35 (see Fig. 6) and which devices may terminate just above the cleats or may in fact drag upon them. In place of the laces a piece of canvas flaps may be used.

Besides the vertical displacement of the forward belt 5 by means of the idler wheels 13 as described, both belts are given a twist or side tilt as they travel along, for the purpose of forcing the asparagus downward toward the butts of the stalks to properly align the same so that the size ejector will operate satisfactorily on the stalks. The tilting of the conveyor belts takes place between the point 8 of Fig. 2 and the horizontal run of the conveyor shown at the right-hand end of Fig. 2, the point of maximum tilt of the belt taking place at the point indicated by dotted line 7 on Fig. 2, and as shown in larger scale in Fig. 7 of the drawings. To give the belts the inclination shown they are supported on shelves or boards 36, 37 during part of their travel and which boards are given the tilt it is desired the belts are to follow, while at the lower edge of each belt is another board or guide plate as indicated at 38, 39 to keep the belts from becoming bodily displaced and also to afford a stop for the butts of the asparagus stalks so that they will be substantially aligned along the butt ends when the belts are straightened out at a further point of their travel. The belts begin to tilt just above the point 8 on Fig. 2 and extending between the belts while maintained in the tilted condition is the central board numbered 39 in Fig. 7 which terminates in a plow-like end 40 where the tilt of the belts begin. This plow separates the stalks to each belt so they will not overlap and interlace at their ends.

In operation the belts are put in motion and the grillage bars 25 started to oscillating. Water is maintained in the tank 8 to cover the upper run of the conveyors under the grillage bars and the boxes of asparagus are emptied one at a time by inverting same over the receiving frame 23 and pulling the plates from beneath them in the manner described. The asparagus in falling from the box passes through the grillage bars and is kept in alignment thereby and the water greatly aids in keeping them level as they are forced through it to the conveyors. The flexible rubber arches 31 insure that in case two or more stalks get jammed between the grillage bars they will finally pass through with the continued vibratory movement of the bars, while the depending rubber sheets 34 will maintain the stalks parallel and in transversely extending position relative to the conveyors so that they will fall properly in place between the cleats 10 thereof.

As the conveyors ascend angularly out of the water the suspended flaps 34 will roll off any superfluous grass to the lower portion of the conveyor to find lodgment in a free space between the slats, and as the conveyors pass the series of straps 35 the stalks of grass will be rolled backward to a snug position against the slats. Upon reaching the spray pipes 12 the grass will be thoroughly washed of any adherent earth or loose matter and if the stalks should not be properly aligned against the cleats they will be forced backward and longitudinally by the water streams, the angle of the spray pipes overcoming the tendency of the grass to pivot on the heavy portion of the body. This arrangement was worked out in practice to overcome this tendency.

As the grass travels along on the belts and the belts begin to tilt the stalks will work longitudinally downward in the manner described and to align the butts substantially at one side of the conveyor belts, so that the stalks may be properly acted upon by the size grading apparatus mentioned, but which will not be shown or described in the present application since it forms no part of the present invention other than that the apparatus of the invention has been especially devised to make the use of such a type of size grading equipment possible, the space between the cleats being provided for the size grading fingers to ride through in the manner described in the copending patent aforesaid.

In the operation of the apparatus, it is contemplated that the conveyor be long enough so that girls positioned at its side can pick off any deformed stalks or remove any extra stalks which may be crowded between two cleats as it is intended that only one stalk lie in the space between two cleats, and if the proportions of the parts are correct this result will usually be maintained automatically.

In considering my invention as above set forth it is manifest that variations in structure may be resorted to within the spirit of the invention, such for instance as the employment of chain conveyors instead of the belt conveyors, the use of springs or other material than rubber for the flexible devices 31, and the use of chains, laces or canvas sheets, in place of the hanging webs 34, as such changes amount to a mere change of material without affecting the description of functioning of the apparatus. Also it is evident that instead of having the double belt conveyors and the field boxes packed in the manner described, a single conveyor could be used and a board used to block half of the box so that one-half only would empty at a time, or special size field boxes could be used which would only hold one row of asparagus. Hence any such modifications in structure or variations in use as suggested are broadly covered in the appended claims.

I claim:

1. In apparatus for handling vegetable stalks, a pair of endless conveyors arranged side by side each adapted to receive a layer of stalks thereon, means for endwise aligning the stalks on the adjacent conveyors, and means for vertically separating the conveyors toward the discharge ends thereof to facilitate the cooperation therewith of a stalk size grader.

2. In a structure as specified in claim 1, a plurality of cross conveyors under the vertically separated portions of the conveyors arranged to transport size graded material therefrom.

3. In apparatus for handling vegetable stalks, a pair of endless conveyors arranged side by side each adapted to receive a layer of stalks thereon, means for tilting the conveyors transversely at an angle whereby the stalks will slide downwardly, and stops at the lower edges of the tilted conveyors for aligning the ends of said stalks.

4. In apparatus for handling vegetable stalks, a pair of endless conveyors arranged side by side each adapted to receive a layer of stalks thereon, means for tilting the conveyors transversely at an angle whereby the stalks will slide downwardly, a plow positioned between said conveyors arranged to separate stalks from overlapping the conveyors as the same are tilted.

5. In apparatus for handling vegetable stalks, an endless conveyor adapted to receive the stalks lying transversely thereon, means for tilting the conveyor transversely for sliding the stalks longitudinally, and means for arresting the sliding of the stalks for aligning their ends, and means for straightening out the conveyor beyond the tilted position.

6. In apparatus for handling elongated vegetables, an endless conveyor arranged and adapted to receive and transport the vegetables, a water bath through which the receiving portion of the conveyor runs, means for feeding the vegetables to the conveyor through said bath and depending flexible devices arranged to guide the vegetables to said conveyor and align the vegetables in transverse extension thereon.

7. In an apparatus for handling elongated vegetables, a traveling conveyor adapted to receive and transport the vegetables, means positioned above the conveyor arranged and adapted to receive an inverted box of said vegetables, a series of grillage bars positioned between the box when inverted and the conveyor extending transversely of the conveyor for transversely positioning the vegetables on the conveyor.

8. In an apparatus for handling elongated vegetables, a travelling conveyor adapted to receive and transport the vegetables, means positioned above the conveyor arranged and adapted to receive an inverted box of said vegetables, a series of grillage bars positioned between the box when inverted and the conveyor extending transversely of the conveyor for transversely positioning the vegetables on the conveyor and means for oscillating the series of bars longitudinally of the conveyor.

9. In an apparatus for handling elongated vegetables, a travelling conveyor adapted to receive and transport the vegetables, a series of grillage bars positioned above and extending transversely of the conveyor and through which the vegetables are guided to the conveyor.

10. In an apparatus for handling elongated vegetables, a travelling conveyor adapted to receive and transport the vegetables, a series of grillage bars positioned above and extending transversely of the conveyor and through which the vegetables are guided to the conveyor, and means for oscillating the series of bars longitudinally of the conveyor.

11. In an apparatus for handling elongated vegetables, a travelling conveyor adapted to receive and transport the vegetables, a series of grillage bars positioned above and extending transversely of the conveyor and through which the vegetables are guided to the conveyor, and opposed resilient pad-like devices on the grillage bars.

12. In an apparatus for handling elongated vegetables, a travelling conveyor adapted to receive and transport the vegetables, a series of grillage bars positioned above and extending transversely of the conveyor and through which the vegetables are guided to the conveyor, and dependent flexible devices hanging below the grillage bars adapted to guide the vegetables to the conveyor.

13. In an apparatus for handling elongated vegetables, a travelling conveyor adapted to receive and transport the vegetables, devices on said conveyor adapted for aligning the vegetables in transverse extension thereon, and a water spray pipe above the conveyor extending angularly across the conveyor for spraying water against the vegetables progressively from one end first to the other end of the individual vegetables in the travel of the conveyor.

14. In an apparatus for handling elongated vegetables, a travelling conveyor adapted to receive and transport the vegetables, a receiving frame mounted over the conveyor adapted to receive an inverted box of vegetables, and means below the receiving frame adapted to guide the vegetables to the conveyor.

15. The method of handling asparagus which comprises filling the field boxes with two rows of stalks pointing in the same direction, inverting the box, and conveying the two rows of stalks from under the box in separate paths for subsequent operations thereon.

16. In an apparatus for handling elongated vegetables, a travelling conveyor adapted to receive and transport the vegetables, a receiving frame mounted over the conveyor adapted to receive an inverted box of vegetables, and means below the receiving frame adapted to guide the vegetables to the conveyor and a series of flexible dependent devices arranged to drag on the vegetables while on the conveyor for rolling same to proper position thereon.

EMIL H. NIELSEN.